(12) United States Patent
Mizuta et al.

(10) Patent No.: US 9,028,738 B2
(45) Date of Patent: May 12, 2015

(54) TIRE VULCANIZER AND TIRE VULCANIZING METHOD

(75) Inventors: Yuichiro Mizuta, Takasago (JP);
Yasuhiko Fujieda, Takasago (JP);
Masahiro Doe, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 365 days.

(21) Appl. No.: 13/475,310

(22) Filed: May 18, 2012

(65) Prior Publication Data

US 2012/0319330 A1 Dec. 20, 2012

(30) Foreign Application Priority Data

Jun. 14, 2011 (JP) .................................. 2011-131802

(51) Int. Cl.
*B29D 30/06* (2006.01)

(52) U.S. Cl.
CPC .... *B29D 30/0601* (2013.01); *B29D 2030/0651* (2013.01); *B29D 2030/0675* (2013.01)

(58) Field of Classification Search
USPC ........................................................ 264/326
See application file for complete search history.

(56) References Cited

U.S. PATENT DOCUMENTS

| 3,870,443 A | 3/1975 | Schatz |
| 4,744,931 A | 5/1988 | Trapp |
| 5,164,199 A | 11/1992 | Fujieda et al. |
| 2010/0007038 A1 | 1/2010 | Mitamura et al. |

FOREIGN PATENT DOCUMENTS

| JP | 4-14413 | 1/1992 |
| JP | 9-239734 | 9/1997 |
| JP | 2008-162269 | 7/2008 |

OTHER PUBLICATIONS

Extended European Search Report issued Sep. 25, 2012 in Patent Application No. 12169714.8.

*Primary Examiner* — Joseph S Del Sole
*Assistant Examiner* — John Robitaille
(74) *Attorney, Agent, or Firm* — Oblon, McClelland, Maier & Neustadt, L.L.P.

(57) ABSTRACT

In a tire vulcanizer having two sets of portions, each of which includes a lower mold, an upper mold, and a center mechanism provided with a bladder, a nitrogen gas heated in a first heating device is supplied to an interior of the bladder of the center mechanism which is placed on the upstream side in the circulating direction of the nitrogen gas. The nitrogen gas discharged from the interior of the bladder of the center mechanism is used for vulcanization and patterning and a temperature thereof is lowered. However, this nitrogen gas is heated again in a second heating device, so that the temperature is increased. Therefore, the nitrogen gas heated in the second heating device is supplied to an interior of the bladder of the center mechanism which is placed on the downstream side in the circulating direction of the nitrogen gas.

7 Claims, 4 Drawing Sheets

TIRE VULCANIZER AND TIRE VULCANIZING METHOD

BACKGROUND OF THE INVENTION

1. Field of the Invention

The present invention relates to a tire vulcanizer for squeezing upper molds and lower molds so as to vulcanize and pattern green tires, and a tire vulcanizing method.

2. Description of the Related Art

In a manufacturing step of a tire, a green tire made by assembling constituent members of the tire is vulcanized by a tire vulcanizer. A bladder to be inflated by a low-pressure pressure medium is closely attached to an inner circumferential surface of the green tire installed between openable and closable upper and lower molds by a center mechanism of the tire vulcanizer. After that, the green tire is heated from inside by squeezing of the upper and lower molds and introduction of a high-pressure heating medium to an interior of the bladder. The upper and lower molds are always heated by platen, the green tire is vulcanized by heating from an inner surface and an outer surface thereof.

There are various types of tire vulcanizers used in a vulcanization step. Japanese Unexamined Patent Application Publication No. H9-239734 discloses a twin type tire vulcanizer in which one open/close device opens and closes two sets of upper and lower molds. It should be noted that although a single type tire vulcanizer in which one open/close device opens and closes one set of upper and lower molds is used in the market, cost per one set of upper and lower molds is lower in the twin type tire vulcanizer. Thus, a use ratio of the twin type tire vulcanizer is extremely high.

Japanese Unexamined Patent Application Publication No. 2008-162269 discloses a tire vulcanizer in which pressure and a temperature of a heating and pressurizing medium supplied to an interior of a bladder are respectively individually controlled. This tire vulcanizer has a gas supply source for supplying a high-pressure nitrogen gas, and a gas supply source for supplying a low-pressure nitrogen gas. By supplying the low-pressure nitrogen gas to the interior of the bladder before vulcanization, the bladder is closely attached to an inner circumferential surface of a tire. At this time, the high-pressure nitrogen gas is preliminarily heated by a heating means while being circulated in a closed-loop medium circulating passage, and a medium supplying passage and a medium returning passage providing communication between the medium circulating passage and the interior of the bladder are closed by a valve operation.

A temperature of the high-pressure nitrogen gas circulated in the medium circulating passage is increased to a predetermined temperature. In this state, when upper and lower molds are closed and a squeezing force is imposed between the upper and lower molds, communication between the medium circulating passage, and the medium supplying passage and the medium returning passage is provided by the valve operation, so that the vulcanization is performed. The preliminarily heated high-pressure nitrogen gas is supplied to the interior of the bladder through the medium supplying passage. The nitrogen gas discharged from the interior of the bladder is recovered to the medium circulating passage through the medium returning passage.

In the tire vulcanizer of Japanese Unexamined Patent Application Publication No. 2008-162269, one system for circulating a heating and pressurizing medium with respect to one set of upper and lower molds is provided. However, as in Japanese Unexamined Patent Application Publication No. H9-239734, a twin type tire vulcanizer in which two sets of upper and lower molds are driven by one open/close device is widely used. When the system of Japanese Unexamined Patent Application Publication No. 2008-162269 is applied to the twin type tire vulcanizer, systems for circulating a heating and pressurizing medium are respectively provided for the two sets of upper and lower molds. In general, in the twin type tire vulcanizer, the tires of the same size are respectively vulcanized in the two sets of upper and lower molds. Therefore, the two same systems are uneconomically provided.

SUMMARY OF THE INVENTION

An object of the present invention is to provide a tire vulcanizer capable of improving economical efficiency in a twin type tire vulcanizer, and a tire vulcanizing method.

A tire vulcanizer in the present invention includes two sets of vulcanizing and patterning portions, each of which includes a lower mold, an upper mold openable and closable relative to the lower mold, and a center mechanism provided with a bladder to be installed in a green tire, the vulcanizing and patterning portions for squeezing the green tires with the lower molds and the upper molds after shaping of installing the bladders to the green tires, so as to perform vulcanization and patterning, a medium circulating passage for circulating a vulcanization gas, medium supplying passages respectively provided for the center mechanisms and connected to the medium circulating passage, the medium supplying passages for supplying the vulcanization gas circulated in the medium circulating passage to interiors of the bladders, medium returning passages respectively provided for the center mechanisms and connected to the medium circulating passage on the downstream side in the circulating direction of the vulcanization gas with respect to the medium supplying passages, the medium returning passages for recovering the vulcanization gas discharged from the interiors of the bladders to the medium circulating passage, a pump provided in the medium circulating passage, for pressurizing the vulcanization gas, supply switching valves respectively provided in the medium supplying passages, for opening and closing the medium supplying passages, exhaust switching valves respectively provided in the medium returning passages, for opening and closing the medium returning passages, bypass valves provided in the medium circulating passage and respectively arranged for the center mechanisms between a point where the medium supplying passages are connected to the medium circulating passage and a point where the medium returning passages are connected to the medium circulating passage, the bypass valves for opening and closing the medium circulating passage, a first heating device provided in the medium circulating passage and arranged on the upstream side with respect to a point where the medium supplying passage provided in the center mechanism which is placed on the upstream side in the circulating direction of the vulcanization gas is connected to the medium circulating passage, the first heating device for heating the vulcanization gas, and a second heating device provided in the medium circulating passage and arranged between a point where the medium returning passage provided in the center mechanism which is placed on the upstream side in the circulating direction of the vulcanization gas is connected to the medium circulating passage, and a point where the medium supplying passage provided in the center mechanism which is placed on the downstream side in the circulating direction of the vulcanization gas is connected to the medium circulating passage, the second heating device for heating the vulcanization gas.

According to the above configuration, the vulcanization gas heated in the first heating device is supplied to the interior of the bladder of the center mechanism which is placed on the upstream side in the circulating direction of the vulcanization gas. Thereby, the vulcanization and the patterning of the green tire are performed in the upper and lower molds placed on the upstream side in the circulating direction of the vulcanization gas. The vulcanization gas discharged from the interior of the bladder of the center mechanism which is placed on the upstream side in the circulating direction of the vulcanization gas is used for the vulcanization and the patterning, so that a temperature thereof is lowered. However, this vulcanization gas is heated again in the second heating device, so that the temperature is increased. Therefore, the vulcanization gas heated in the second heating device is supplied to the interior of the bladder of the center mechanism which is placed on the downstream side in the circulating direction of the vulcanization gas. Thereby, the vulcanization and the patterning of the green tire are performed in the upper and lower molds placed on the downstream side in the circulating direction of the vulcanization gas. The vulcanization gas discharged from the interior of the bladder of the center mechanism which is placed on the downstream side in the circulating direction of the vulcanization gas is used for the vulcanization and the patterning, so that the temperature thereof is lowered. However, this vulcanization gas is heated again in the first heating device, so that the temperature is increased. In such a way, the vulcanization and the patterning are respectively performed in the two sets of upper and lower molds. In this manner, even when systems for circulating the vulcanization gas are not respectively provided for the center mechanisms, two green tires can be respectively vulcanized and patterned with one system shared by the two center mechanisms. Therefore, the economical efficiency can be improved.

The tire vulcanizer in the present invention further includes medium exhausting passages for exhausting the vulcanization gas discharged from the interiors of the bladders to an exterior, a tank provided in the medium exhausting passage, for storing the vulcanization gas discharged from the interiors of the bladders, and medium supplying paths respectively provided for the center mechanisms, for supplying the vulcanization gas in an interior of the tank to the interiors of the bladders, wherein at the time of at least one of the shaping and beginning of the vulcanization and the patterning, the vulcanization gas in the interior of the tank is supplied to the interiors of the bladders via the medium supplying paths.

According to the above configuration, since the vulcanization gas is generally exhausted through the medium exhausting passages after completion of the vulcanization, thermal energy and pressure energy remaining in the tire vulcanizer are released to the exterior of the tire vulcanizer at the time of the completion of the vulcanization, so that energy efficiency is unfavorable. Thus, the vulcanization gas discharged from the interiors of the bladders is stored in the interior of the tank. The vulcanization gas stored in the interior of the tank is supplied to the interiors of the bladders at the time of the shaping. In general, the bladders are extended with a low-pressure gas supplied from a low-pressure gas supply source at the time of the shaping. However, the bladders are extended with the vulcanization gas stored in the interior of the tank instead of the low-pressure gas. In such a way, by extending the bladders with the vulcanization gas stored in the interior of the tank, the thermal energy and the pressure energy remaining in the tire vulcanizer can be reused, and a supply amount of the low-pressure gas supplied from the low-pressure gas supply source can be decreased. The vulcanization gas stored in the interior of the tank is supplied to the interiors of the bladders at the beginning of the vulcanization and the patterning. In general, the vulcanization and the patterning are performed with a high-temperature and high-pressure vulcanization gas circulated in the medium circulating passage. However, since pressure of the vulcanization gas is lowered at the beginning of the vulcanization and the patterning, there is a need for supplementing a high-pressure vulcanization gas from a vulcanization gas supply source and heating the supplemented vulcanization gas. In this regard, by using the vulcanization gas stored in the interior of the tank at the beginning of the vulcanization and the patterning, the thermal energy and the pressure energy remaining in the tire vulcanizer can be reused, and a supply amount of the high-pressure vulcanization gas supplemented from the vulcanization gas supply source can be decreased, so that thermal energy for heating the supplemented vulcanization gas can be decreased. By using the high-temperature vulcanization gas stored in the interior of the tank at the beginning of the vulcanization and the patterning, a temperature of the interiors of the bladders can be promptly increased, so that a vulcanization time can be shortened. Thereby, energy efficiency can be improved.

A tire vulcanizing method in the present invention is a tire vulcanizing method performed by using the tire vulcanizer, including a step of circulating the vulcanization gas in the medium circulating passage by the pump while closing the supply switching valves and the exhaust switching valves, opening the bypass valves, and heating the vulcanization gas by using at least one of the first heating device and the second heating device, and a step of supplying the vulcanization gas to the interiors of the bladders by the medium supplying passages while opening the supply switching valves and the exhaust switching valves, closing the bypass valves, and heating the vulcanization gas by using the first heating device and the second heating device, and recovering the vulcanization gas discharged from the interiors of the bladders to the medium circulating passage by the medium returning passages, so as to vulcanize and pattern the tires.

According to the tire vulcanizer and the tire vulcanizing method of the present invention, even when systems for circulating the vulcanization gas are not respectively provided for the center mechanisms, two green tires can be respectively vulcanized and patterned with one system shared by the two center mechanisms. Therefore, the economical efficiency can be improved.

DESCRIPTION OF THE PREFERRED EMBODIMENTS

Hereinafter, preferred embodiments of the present invention will be described with reference to the drawings.

First Embodiment

Configuration of Tire Vulcanizer

Figure 1:
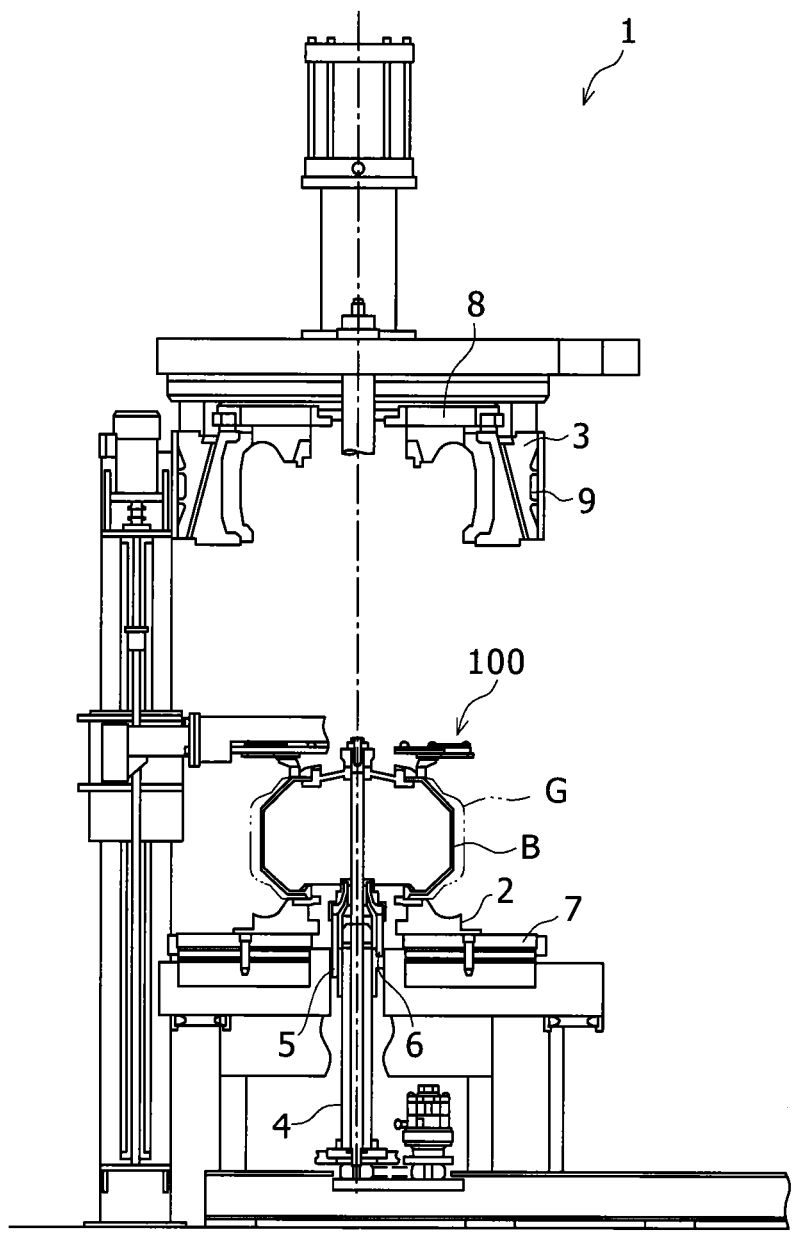
FIG. 1 is a sectional view showing a tire vulcanizer.

A tire vulcanizer 1 according to the present embodiment has lower and upper molds 2, 3 in which a green tire G is detachably placed as shown in FIG. 1. The green tire G is patterned and formed by connecting and attaching constituent members such as a bead, a tread, and a side wall to each other in a patterning step. This green tire G is carried to a vulcanization step, and vulcanized and patterned in the tire vulcanizer 1.

The lower mold 2 is replaceably provided on a lower heat plate 7 serving as a heat source. The upper mold 3 is replaceably provided under an upper heat plate 8 serving as a heat source. A jacket 9 serving as a heat source is provided in a periphery of the upper mold 3. By moving the upper mold 3 upward and downward by an upper structure, the upper mold 3 is openable and closable from the upper side relative to the lower mold 2. As shown in FIG. 1, in a state that the lower mold 2 and the upper mold 3 are opened, the green tire G is carried onto the lower mold 2 by an installation device 100.

On the center lower side of the lower mold 2, a center mechanism 4 provided with an extendable and retractable bag shape bladder B which is made of an elastic material (such as butyl rubber) is arranged. A fluid inlet 5 for introducing a gas to an interior of the bladder B, and a fluid outlet 6 for discharging the gas from the interior of the bladder B are provided in the center mechanism 4. By introducing a low-pressure nitrogen gas from the fluid inlet 5 to the interior of the bladder B, the center mechanism 4 extends the bladder B and closely attaches the bladder B to an inner circumferential surface of the green tire G carried onto the lower mold 2. This step is called a shaping step.

Figure 2:
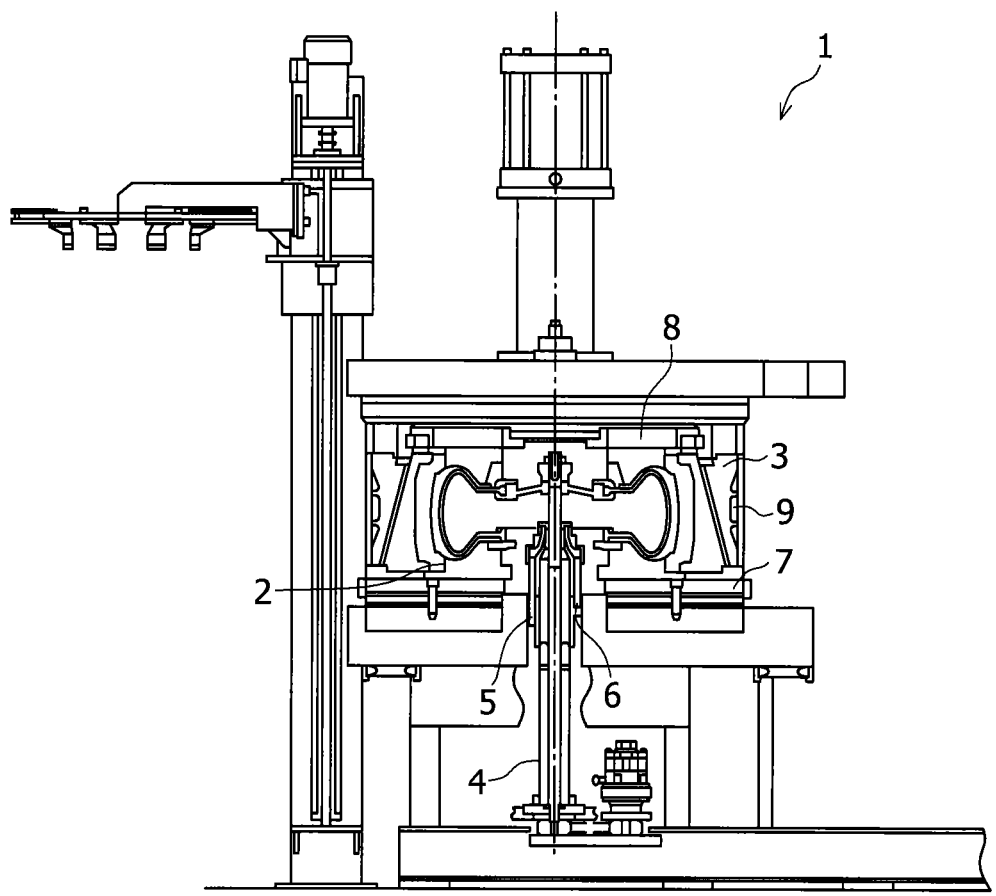
FIG. 2 is a sectional view showing the tire vulcanizer.

When the shaping step is completed, as shown in FIG. 2, the green tire G is vulcanized and patterned. That is, the installation device 100 is retreated from the lower mold 2. By lowering the upper mold 3, the upper mold 3 and the lower mold 2 are closed, so that a squeezing force is generated between the lower and upper molds 2, 3. At the same time, a high-temperature and high-pressure nitrogen gas is introduced from the fluid inlet 5 to the interior of the bladder B. Thereby, the green tire G is heated from inside and outside, so that the green tire G is vulcanized and patterned.

When the vulcanization and patterning step is completed, some vulcanized tires are cooled by a device called a post inflator in a state that the tires are inflated by air pressure in order to prevent deformation at the time of cooling, and further carried to the next step. Other vulcanized tires are left to be naturally cooled and carried to the next step.

FIGS. 1 and 2 show only one set of a vulcanization and patterning portion including the lower and upper molds 2, 3, and the center mechanism 4 provided with the bladder B. However, in the tire vulcanizer 1 of the present embodiment, two sets of vulcanization and patterning portions are arranged in parallel.

Figure 3:
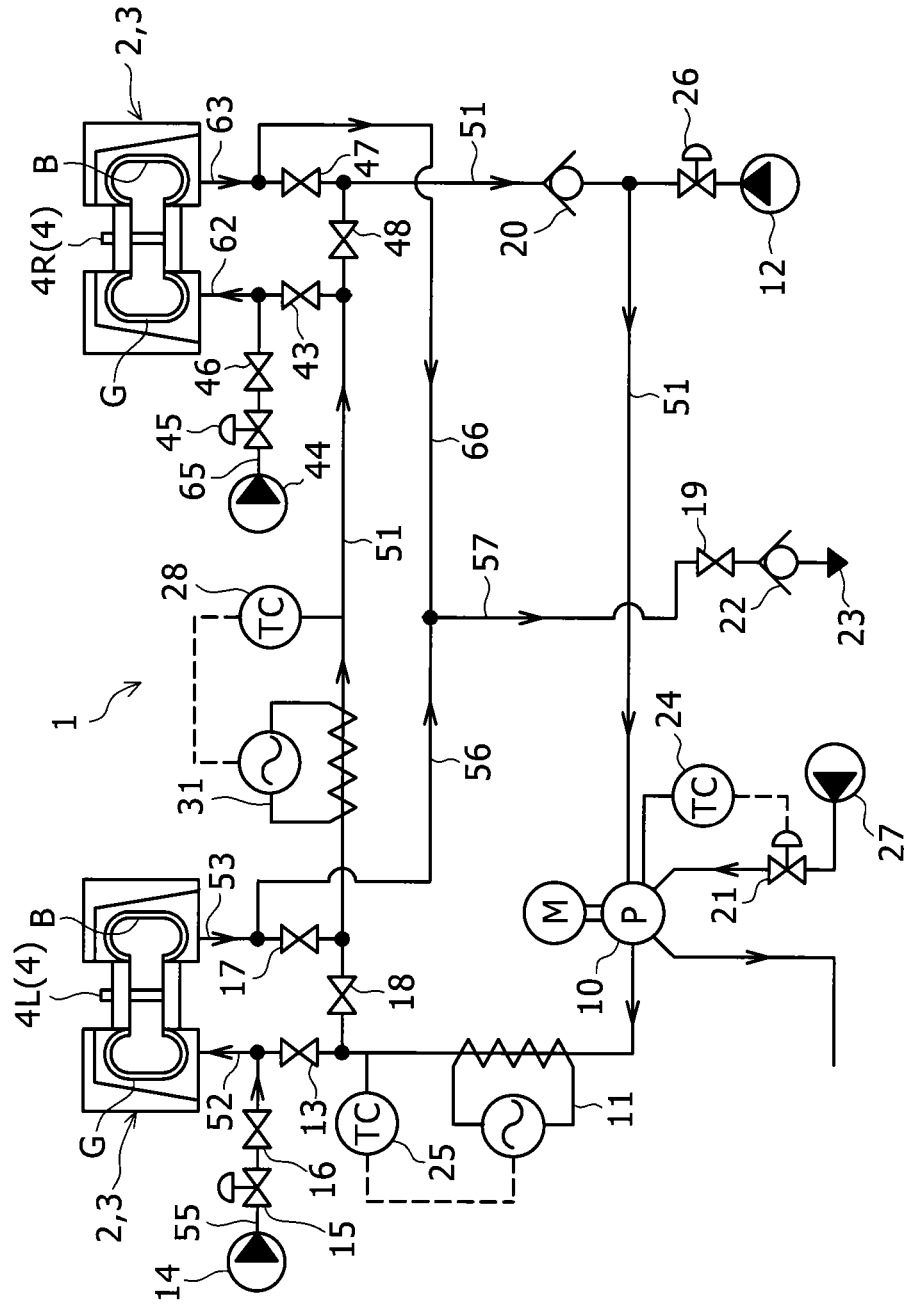
FIG. 3 is a schematic view showing the tire vulcanizer.

FIG. 3 shows a schematic view of a vulcanization system for heating the bladders B from the inside. FIG. 3 shows two sets of lower and upper molds 2, 3 opened and closed by one open/close device. The same-type green tires G are respectively placed in cavities formed by the lower and upper molds 2, 3. In FIG. 3, the left center mechanism 4 is referred to as the center mechanism 4L, and the right center mechanism 4 is referred to as the center mechanism 4R.

The tire vulcanizer 1 has a medium circulating passage 51 for circulating a nitrogen gas (vulcanization gas) clockwise upon preliminarily increasing a temperature of the nitrogen gas to a predetermined temperature before vulcanization and patterning. As the gas supplied to the tire vulcanizer 1, a highly-pure normal-temperature nitrogen gas which is chemically stable is generally used. A high-pressure nitrogen gas is supplied from a high-pressure gas supply port 12 to the medium circulating passage 51. Between the medium circulating passage 51 and the high-pressure gas supply port 12, a pressure control valve 26 for adjusting vulcanization pressure is provided. In the medium circulating passage 51, a pump 10 for pressurizing the nitrogen gas is provided. In the medium circulating passage 51, a check valve 20 for preventing a reverse flow of the nitrogen gas is provided.

Industrial water for cooling a bearing of the pump 10 is supplied from a supply port 27 to the pump 10. Supply of the industrial water from the supply port 27 is controlled by a control valve 21. A temperature sensor 24 is provided in the bearing of the pump 10. The temperature sensor 24 monitors a temperature of the bearing of the pump 10. When the temperature detected by the temperature sensor 24 is higher than a predetermined temperature, the control valve 21 supplies the industrial water from the supply port 27 to the bearing of the pump 10, so as to cool the bearing of the pump 10.

The tire vulcanizer 1 has medium supplying passages 52, 62 respectively provided for the center mechanisms 4L, 4R and connected to the medium circulating passage 51, the medium supplying passages for supplying the nitrogen gas circulated in the medium circulating passage 51 to the interiors of the bladders B. Specifically, the other end of the medium supplying passage 52 whose one end is connected to the medium circulating passage 51 is connected to the fluid inlet 5 of the center mechanism 4L (refer to FIG. 1). The other end of the medium supplying passage 62 whose one end is connected to the medium circulating passage 51 is connected to the fluid inlet 5 of the center mechanism 4R (refer to FIG. 1). A supply switching automatic valve 13 is provided in the medium supplying passage 52. A supply switching automatic valve 43 is provided in the medium supplying passage 62.

The tire vulcanizer 1 has medium returning passages 53, 63 respectively provided for the center mechanisms 4L, 4R and connected to the medium circulating passage 51, the medium returning passages for recovering the nitrogen gas discharged from the interiors of the bladders B to the medium circulating passage 51. Specifically, the other end of the medium returning passage 53 whose one end is connected to the medium circulating passage 51 is connected to the fluid outlet 6 of the center mechanism 4L (refer to FIG. 1). The other end of the medium returning passage 63 whose one end is connected to the medium circulating passage 51 is connected to the fluid outlet 6 of the center mechanism 4R (refer to FIG. 1). The medium returning passages 53, 63 are connected to the medium circulating passage 51 on the downstream side in the circulating direction of the nitrogen gas with respect to the medium supplying passages 52, 62. Specifically, the medium returning passage 53 is connected to the medium circulating passage 51 on the downstream side in the circulating direction of the nitrogen gas with respect to the medium supplying passage 52. Similarly, the medium returning passage 63 is connected to the medium circulating passage 51 on the downstream side in the circulating direction of the nitrogen gas with respect to the medium supplying passage 62. An exhaust switching automatic valve 17 is provided in the medium returning passage 53. An exhaust switching automatic valve 47 is provided in the medium returning passage 63.

The tire vulcanizer 1 has a first heating device 11 provided in the medium circulating passage 51, for heating the nitrogen gas. The first heating device 11 is arranged on the upstream side of a point where the medium supplying passage 52 provided in the center mechanism 4L which is placed on the upstream side in the circulating direction of the nitrogen gas is connected to the medium circulating passage 51. The high-pressure nitrogen gas supplied from the high-pressure gas supply port 12 passes through the medium circulating passage 51, and is further pressurized by the pump 10, and then heated in the first heating device 11.

A temperature sensor 25 for measuring a temperature of the nitrogen gas is provided in an outlet of the first heating device 11. The first heating device 11 controls an output of the first heating device 11 based on the temperature measured by the temperature sensor 25 in such a manner that the temperature of the nitrogen gas at the outlet of the first heating device 11 becomes constant.

Bypass automatic valves 18, 48 are provided in the medium circulating passage 51. The bypass automatic valve 18 is arranged between a point where the medium supplying passage 52 is connected to the medium circulating passage 51 and a point where the medium returning passage 53 is connected to the medium circulating passage 51. The bypass automatic valve 48 is arranged between a point where the medium supplying passage 62 is connected to the medium circulating passage 51 and a point where the medium returning passage 63 is connected to the medium circulating passage 51.

In a case where the bypass automatic valves 18, 48 are opened and the supply switching automatic valves 13, 43 and the exhaust switching automatic valves 17, 47 are closed, the nitrogen gas is circulated in the medium circulating passage 51. Meanwhile, in a case where the bypass automatic valves 18, 48 are closed and the supply switching automatic valves 13, 43 and the exhaust switching automatic valves 17, 47 are opened, the nitrogen gas circulated in the medium circulating passage 51 is supplied to the interior of the bladder B of the left center mechanism 4L through the medium supplying passage 52. The nitrogen gas discharged from the interior of the bladder B of the left center mechanism 4L is recovered to the medium circulating passage 51 through the medium returning passage 53. Further, the nitrogen gas recovered to the medium circulating passage 51 is supplied to the interior of the bladder B of the right center mechanism 4R through the medium supplying passage 62. The nitrogen gas discharged from the interior of the bladder B of the right center mechanism 4R is recovered to the medium circulating passage 51 through the medium returning passage 63 and recovered to the pump 10 through the check valve 20.

The tire vulcanizer 1 has a second heating device 31 provided in the medium circulating passage 51, for heating the nitrogen gas. The second heating device 31 is arranged between a point where the medium returning passage 53 provided in the center mechanism 4L which is placed on the upstream side in the circulating direction of the nitrogen gas is connected to the medium circulating passage 51 and a point where the medium supplying passage 62 provided in the center mechanism 4R which is placed on the downstream side in the circulating direction of the nitrogen gas is connected to the medium circulating passage 51.

In a case where the bypass automatic valves 18, 48 are opened and the supply switching automatic valves 13, 43 and the exhaust switching automatic valves 17, 47 are closed, the nitrogen gas circulated in the medium circulating passage 51 is heated in the second heating device 31. Meanwhile, in a case where the bypass automatic valves 18, 48 are closed and the supply switching automatic valves 13, 43 and the exhaust switching automatic valves 17, 47 are opened, the nitrogen gas discharged from the interior of the bladder B of the left center mechanism 4L is heated in the second heating device 31 and then supplied to the interior of the bladder B of the right center mechanism 4R through the medium supplying passage 62.

A temperature sensor 28 for measuring the temperature of the gas is provided in an outlet of the second heating device 31. The second heating device 31 controls an output of the second heating device 31 based on the temperature measured by the temperature sensor 28 in such a manner that the temperature of the gas at the outlet of the second heating device 31 becomes constant.

A medium supplying path 55 through which a low-pressure nitrogen gas supplied from a low-pressure gas supply port 14 passes is connected to the medium supplying passage 52. A decompression valve 15 and an automatic switch valve 16 are provided in this order in the medium supplying path 55 along the supplying direction of the low-pressure nitrogen gas. The decompression valve 15 adjusts pressure of the low-pressure nitrogen gas supplied from the low-pressure gas supply port 14. In a case where the supply switching automatic valve 13 is closed and the automatic switch valve 16 is opened, the low-pressure nitrogen gas supplied from the low-pressure gas supply port 14 is fed to the medium supplying passage 52 through the medium supplying path 55, and supplied to the interior of the bladder B of the left center mechanism 4L.

Similarly, a medium supplying path 65 through which a low-pressure nitrogen gas supplied from a low-pressure gas supply port 44 passes is connected to the medium supplying passage 62. A decompression valve 45 and an automatic switch valve 46 are provided in this order in the medium supplying path 65 along the supplying direction of the low-pressure nitrogen gas. The decompression valve 45 adjusts pressure of the low-pressure nitrogen gas supplied from the low-pressure gas supply port 44. In a case where the supply switching automatic valve 43 is closed and the automatic switch valve 46 is opened, the low-pressure nitrogen gas supplied from the low-pressure gas supply port 44 is fed to the medium supplying passage 62 through the medium supplying path 65, and supplied to the interior of the bladder B of the right center mechanism 4R.

The tire vulcanizer 1 has medium exhausting passages 56, 66, 57 for exhausting the nitrogen gas discharged from the interiors of the bladders B to an exterior. Specifically, the medium exhausting passage 56 branches from the medium returning passage 53. The medium exhausting passage 66 branches from the medium returning passage 63. The medium exhausting passage 56 and the medium exhausting passage 66 merge into the medium exhausting passage 57. An exhausting automatic valve 19 is provided in the medium exhausting passage 57, and the nitrogen gas passing through the exhausting automatic valve 19 is discharged from an exhaust port 23 to the exterior through a check valve 22 for preventing a reverse flow. In a case where the exhaust switching automatic valve 17 is closed and the exhausting automatic valve 19 is opened, the nitrogen gas discharged from the interior of the bladder B of the left center mechanism 4L is discharged from the exhaust port 23 to the exterior through the medium returning passage 53, the medium exhausting passage 56, and the medium exhausting passage 57. In a case where the exhaust switching automatic valve 47 is closed and the exhausting automatic valve 19 is opened, the nitrogen gas discharged from the interior of the bladder B of the right center mechanism 4R is discharged from the exhaust port 23 to the exterior through the medium returning passage 63, the medium exhausting passage 66, and the medium exhausting passage 57.

In general, a large number of tire vulcanizers 1 are installed in a tire factory, and main pipes are provided for utility of these tire vulcanizers 1. The high-pressure gas supply port 12, the low-pressure gas supply port 14, and the low-pressure gas supply port 44 shown in FIG. 3 are connection ports to the main pipes in the factory.

Operations of Tire Vulcanizer

Next, operations of the tire vulcanizer 1 (tire vulcanizing method) will be described.

The vulcanization and the patterning of the tires are started after the lower and upper molds 2, 3, the bladders B, and the like are sufficiently preliminarily heated. There is also a need for preliminarily increasing (preliminarily heating) the temperature of the nitrogen gas circulated in the medium circulating passage 51 to a predetermined temperature. Firstly, the supply switching automatic valves 13, 43 and the exhaust switching automatic valves 17, 47 are closed and the bypass automatic valves 18, 48 are opened. In this state, the pump 10 is rotated, and the first heating device 11 and the second heating device 31 provided in the medium circulating passage 51 are operated. The nitrogen gas supplied from the high-pressure gas supply port 12 is circulated in the medium circulating passage 51 by the pump 10, and in the meantime, heated to the predetermined temperature in the first heating device 11 and the second heating device 31. At this time, the control valve 21 controls supply of cooling water (industrial water) in such a manner that the temperature of the bearing of the pump 10 is not increased to the predetermined temperature or more.

As shown in FIG. 1, before the vulcanization, the green tires G are gripped by the installation devices 100 and loaded onto the lower molds 2 in the center mechanisms 4 (4L, 4R). As shown in FIG. 3, in the left center mechanism 4L, the low-pressure nitrogen gas is supplied from the medium supplying path 55 to the interior of the bladder B. Specifically, the automatic switch valve 16 is opened and the low-pressure nitrogen gas from the low-pressure gas supply port 14 is supplied to the interior of the bladder B via the decompression valve 15 and the automatic switch valve 16. Similarly, in the right center mechanism 4R, the low-pressure nitrogen gas is supplied from the medium supplying path 65 to the interior of the bladder B. Specifically, the automatic switch valve 46 is opened and the low-pressure nitrogen gas from the low-pressure gas supply port 44 is supplied to the interior of the bladder B via the decompression valve 45 and the automatic switch valve 46. Thereby, the bladders B are extended in the center mechanisms 4L, 4R, and the bladders B are closely attached to the inner circumferential surfaces of the green tires G. At this time, there is a need for strictly controlling the pressure of the low-pressure nitrogen gas in order to closely attach the bladders B to the inner circumferential surfaces of the green tires G. Thus, the pressure of the low-pressure nitrogen gas is individually controlled by the decompression valves 15, 45 respectively provided in the medium supplying paths 55, 65.

After the shaping step of closely attaching the bladders B to the inner circumferential surfaces of the green tires G, the installation devices 100 are retreated from the lower molds 2. After that, as shown in FIG. 2, the upper molds 3 are lowered and the lower molds 2 and the upper molds 3 are closed, so that the squeezing force is generated between the lower and upper molds 2, 3. As shown in FIG. 3, the automatic switch valves 16, 46 are respectively closed. The supply switching automatic valves 13, 43, the exhaust switching automatic valves 17, 47 are opened, and the bypass automatic valves 18, 48 are closed. Thereby, a closed circuit running from the medium circulating passage 51, the medium supplying passage 52, the interior of the bladder B of the left center mechanism 4L, the medium returning passage 53, the medium circulating passage 51, the medium supplying passage 62, the interior of the bladder B of the right center mechanism 4R, the medium returning passage 63, to the medium circulating passage 51 is formed.

When the above closed circuit is formed, the vulcanization and the patterning are started. Immediately after start of the vulcanization and the patterning, the nitrogen gas which has been circulated in the medium circulating passage 51 is supplied to the interior of the bladder B of the left center mechanism 4L through the medium supplying passage 52. At this time, since a capacity of the interior of the bladder B is large, pressure of the closed circuit is lowered immediately after the start of the vulcanization and the patterning. When the pressure of the closed circuit is lowered, the normal-temperature and high-pressure nitrogen gas is supplemented into the closed circuit from the high-pressure gas supply port 12. This nitrogen gas is pressurized by the pump 10, heated in the first heating device 11, and supplied to the interior of the bladder B of the left center mechanism 4L. The nitrogen gas discharged from the interior of the bladder B of the left center mechanism 4L is used for the vulcanization and the patterning, so that the temperature thereof is lowered. However, the nitrogen gas is heated again in the second heating device 31 and then supplied to the interior of the bladder B of the right center mechanism 4R. Until the pressure of the closed circuit reaches predetermined pressure, the high-pressure nitrogen gas continues to be supplied from the high-pressure gas supply port 12. The pressure control valve 26 provided between the high-pressure gas supply port 12 and the medium circulating passage 51 controls the pressure in such a manner that the pressure of the closed circuit becomes the predetermined pressure. It should be noted that the vulcanization of the tires largely depends on the temperature but does not largely depend on the pressure. Thus, without using the pressure control valve 26, the high-pressure nitrogen gas may be supplied directly from the main pipe whose pressure is controlled. A flow of the nitrogen gas in the reverse direction of the closed circuit is suppressed by the check valve 20.

When the high-pressure nitrogen gas is supplied from the high-pressure gas supply port 12 to the closed circuit, the pressure of the closed circuit reaches supply pressure in a short time. The pump 10 has a capability of generating differential pressure of about 0.1 MPa to 0.2 MPa between an inlet and an outlet at a flow rate of about 1 $m^3$ in order to circulate the nitrogen gas, and acts as a pressurization and circulation device for pressurizing and circulating the nitrogen gas on the inlet side. When the system is designed in such a manner that a pressure loss of the nitrogen gas circulated in the closed circuit becomes the differential pressure generation capability of the pump 10 or less, without newly supplying the high-pressure nitrogen gas from the exterior, the nitrogen gas is circulated in the closed circuit at the predetermined pressure.

The nitrogen gas circulated in the closed circuit is firstly heated in the first heating device 11. At this time, by measuring the temperature of the nitrogen gas on the outlet side of the first heating device 11 by the temperature sensor 25, and controlling the output of the first heating device 11 based on the temperature measured by the temperature sensor 25, the temperature of the nitrogen gas on the outlet side of the first heating device is maintained to be constant. For example, when the normal-temperature and high-pressure nitrogen gas is supplied from the high-pressure gas supply port 12 immediately after the start of the vulcanization and the patterning, the temperature of the nitrogen gas on the outlet side of the first heating device 11 is radically lowered. Then, the first heating device 11 increases the output and heats the nitrogen gas with a full output, and lowers the output in accordance with an increase in the temperature of the nitrogen gas on the outlet side.

The nitrogen gas heated in the first heating device 11 is supplied to the interior of the bladder B of the left center mechanism 4L placed on the upstream side in the circulating direction of the nitrogen gas. Thereby, in the lower and upper molds 2, 3 on the side of the left center mechanism 4L, the vulcanization and the patterning of the green tire G are performed. The nitrogen gas discharged from the interior of the bladder B of the left center mechanism 4L is used for the vulcanization and the patterning, so that the temperature thereof is lowered. However, this nitrogen gas is heated again in the second heating device 31, so that the temperature is increased. At this time, by measuring the temperature of the nitrogen gas on the outlet side of the second heating device 31 by the temperature sensor 28, and controlling the output of the second heating device 31 based on the temperature measured by the temperature sensor 28, the temperature of the nitrogen gas on the outlet side of the second heating device 31 is maintained to be constant. Therefore, the nitrogen gas heated in the second heating device 31 is supplied to the interior of the bladder B of the right center mechanism 4R placed on the downstream side in the circulating direction of the nitrogen gas. Thereby, in the lower and upper molds 2, 3 on the side of the right center mechanism 4R, the vulcanization and the patterning of the green tire G are performed. The nitrogen gas discharged from the interior of the bladder B of the right center mechanism 4R is used for the vulcanization and the patterning, so that the temperature thereof is lowered. However, this nitrogen gas is supplied again to the pump 10 and heated again in the first heating device 11, so that the temperature is increased. In such a way, the nitrogen gas is circulated in the closed circuit, and the vulcanization and the patterning are performed respectively in the two sets of lower and upper molds 2, 3.

When a preliminarily determined time elapses, the vulcanization and the patterning are completed. Specifically, the bypass automatic valves 18, 48 are opened, the supply switching automatic valves 13, 43 and the exhaust switching automatic valves 17, 47 are closed, and the exhausting automatic valve 19 is opened. Thereby, the nitrogen gas discharged from the interior of the bladder B of the left center mechanism 4L is discharged from the exhaust port 23 to the main pipe through the medium exhausting passage 56 and the medium exhausting passage 57, and the nitrogen gas discharged from the interior of the bladder B of the right center mechanism 4R is discharged from the exhaust port 23 to the main pipe through the medium exhausting passage 66 and the medium exhausting passage 57. Then, the lower molds 2 and the upper molds 3 are opened, and the vulcanized tires are taken out from the lower and upper molds 2, 3, and carried out to the next step.

The nitrogen gas fed out from the pump 10 at the time of completing the vulcanization and the patterning is fed to the second heating device 31 through the first heating device 11 and the bypass automatic valve 18, and further circulated in the medium circulating passage 51 serving as a passage to recover to the pump 10 through the bypass automatic valve 48. In this circulation, the first heating device 11 and the second heating device 31 respectively adjust the outputs in such a manner that the temperatures of the nitrogen gas on the outlet side become the predetermined temperature (are preliminarily heated).

Effects

As described above, with the tire vulcanizer 1 and the tire vulcanizing method according to the present embodiment, the nitrogen gas heated in the first heating device 11 is supplied to the interior of the bladder B of the left center mechanism 4L placed on the upstream side in the circulating direction of the nitrogen gas. Thereby, in the lower and upper molds 2, 3 placed on the upstream side in the circulating direction of the nitrogen gas (on the side of the left center mechanism 4L), the vulcanization and the patterning of the green tire G are performed. The nitrogen gas discharged from the interior of the bladder B of the left center mechanism 4L which is placed on the upstream side in the circulating direction of the nitrogen gas is used for the vulcanization and the patterning, so that the temperature thereof is lowered. However, this nitrogen gas is heated again in the second heating device 31, so that the temperature is increased. Therefore, the nitrogen gas heated in the second heating device 31 is supplied to the interior of the bladder B of the right center mechanism 4R placed on the downstream side in the circulating direction of the nitrogen gas. Thereby, in the lower and upper molds 2, 3 placed on the downstream side in the circulating direction of the nitrogen gas (on the side of the right center mechanism 4R), the vulcanization and the patterning of the green tire G are performed. The nitrogen gas discharged from the interior of the bladder B of the right center mechanism 4R which is placed on the downstream side in the circulating direction of the nitrogen gas is used for the vulcanization and the patterning, so that the temperature thereof is lowered. However, this nitrogen gas is heated again in the first heating device 11, so that the temperature is increased. In such a way, the vulcanization and the patterning are respectively performed in the two sets of lower and upper molds 2, 3. In this manner, even when systems for circulating the nitrogen gas are not respectively provided for the center mechanisms 4L, 4R, the two green tires G can be respectively vulcanized and patterned with one system shared by the two center mechanisms 4L, 4R. Therefore, economical efficiency can be improved.

Second Embodiment

Configuration of Tire Vulcanizer

Next, a tire vulcanizer 201 according to a second embodiment will be described. It should be noted that the same configurations as the tire vulcanizer 1 according to the first embodiment will be given the same reference numerals, and description thereof will be omitted.

Figure 4:
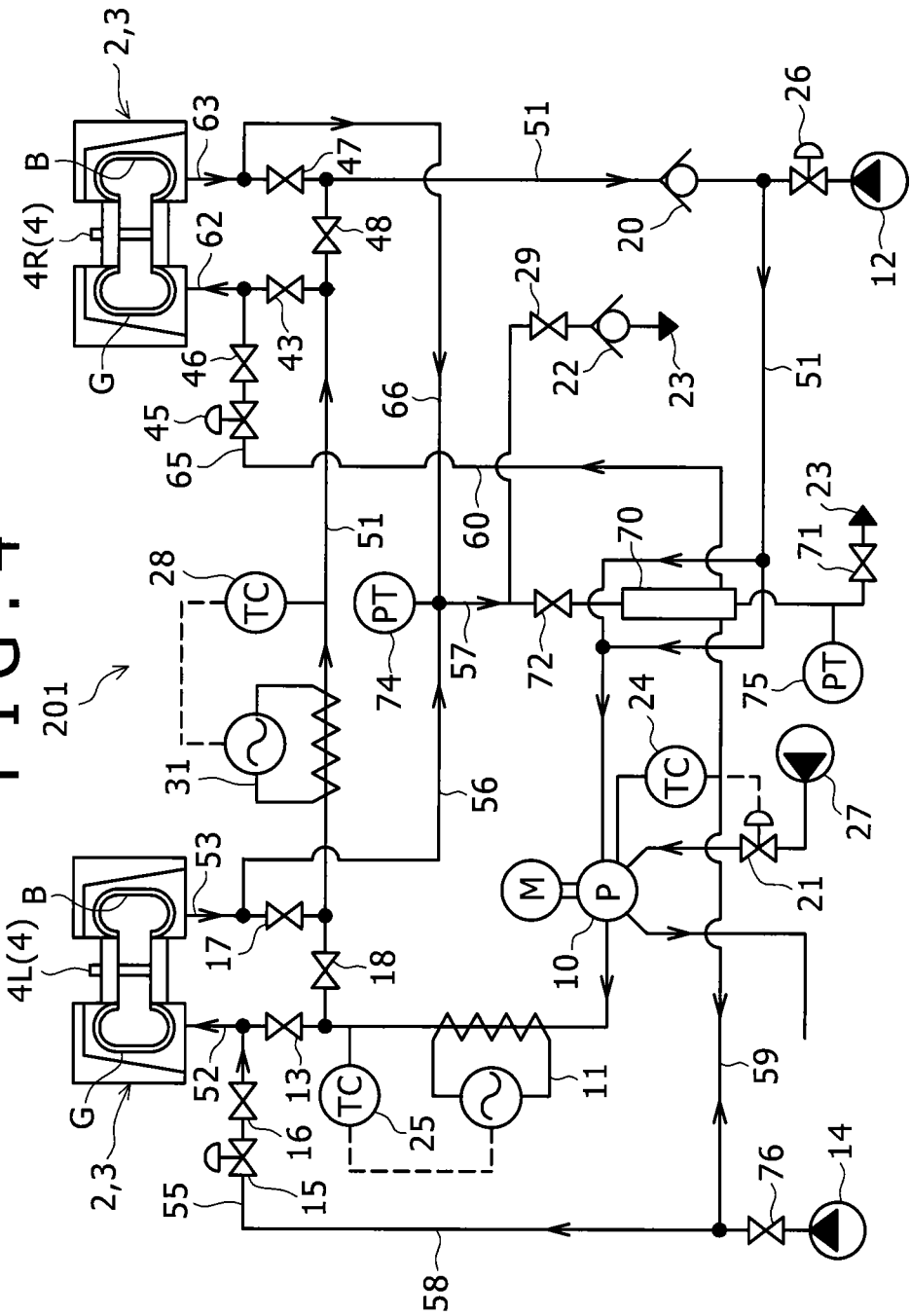
FIG. 4 is a schematic view showing a tire vulcanizer.

The tire vulcanizer 201 of the second embodiment is different from the tire vulcanizer 1 of the first embodiment in a point that as shown in FIG. 4, the tire vulcanizer has a tank 70 provided in the medium exhausting passage 57, for storing the nitrogen gas discharged from the interiors of the bladders B, and medium supplying paths 58, 59, 60 respectively provided for the center mechanisms 4L, 4R, for supplying the nitrogen gas in an interior of the tank 70 to the interiors of the bladders B.

The nitrogen gas discharged from the interiors of the bladders B of the center mechanisms 4L, 4R passes through the medium exhausting passage 56 and the medium exhausting passage 66 and merges in the medium exhausting passage 57. The medium exhausting passage 57 branches into a passage through which the gas is discharged from the exhaust port 23 to the exterior through an automatic switch valve 29 and the check valve 22, and a passage through which the gas flows to the interior of the tank 70 through an automatic switch valve 72.

The nitrogen gas discharged from the interior of the tank 70 passes through an automatic exhaust valve 71 and is discharged from the same exhaust port 23 from which the nitrogen gas passing through the automatic switch valve 29 and the check valve 22 is also discharged to the exterior. The automatic exhaust valve 71 is closed at the time of the vulcanization and the patterning, and opened at the time of stop of the tire vulcanizer 201, so as to discharge the nitrogen gas in the interior of the tank 70 to the exterior.

Pressure sensors 74, 75 are respectively provided at a point where the medium exhausting passage 56 and the medium exhausting passage 66 merge and at an outlet of the tank 70. In a case where a difference between the pressure sensor 74 and the pressure sensor 75 is a fixed value or less, the automatic switch valve 72 is closed and the automatic switch valve 29 is opened. Thereby, the nitrogen gas discharged from interiors of the bladders B is discharged from the exhaust port 23 to the exterior through the automatic switch valve 29 and the check valve 22. Meanwhile, in a case where the difference between the pressure sensor 74 and the pressure sensor 75 is larger than the fixed value, the automatic switch valve 29 is closed and the automatic switch valve 72 is opened. Thereby, the nitrogen gas discharged from the interiors of the bladders B is stored in the interior of the tank 70.

The low-pressure gas supply port 14 is connected to the medium supplying path 55 via the medium supplying path 58, and also connected to the medium supplying path 65 via the medium supplying path 59 and the medium supplying path 60. A switch valve 76 is provided on the side of the low-pressure gas supply port 14 with respect to a point where the medium supplying path 59 is connected to the medium supplying path 58. In a case where the switch valve 76 is opened, the low-pressure nitrogen gas from the low-pressure gas supply port 14 is supplied to the interior of the bladder B of the left center mechanism 4L through the medium supplying path 58 and the medium supplying path 55, and also supplied to the interior of the bladder B of the right center mechanism 4R through the medium supplying path 59, the medium supplying path 60, and the medium supplying path 65. Meanwhile, in a case where the switch valve 76 is closed, the nitrogen gas in the interior of the tank 70 is supplied to the interior of the bladder B of the left center mechanism 4L through the medium supplying path 59, the medium supplying path 58, and the medium supplying path 55, and also supplied to the interior of the bladder B of the right center mechanism 4R through the medium supplying path 60 and the medium supplying path 65.

The medium circulating passage 51 is arranged around the tank 70. The nitrogen gas in the interior of the tank 70 is heated with the nitrogen gas circulated in the medium circulating passage 51. Thereby, a decrease in the temperature of the nitrogen gas in the interior of the tank 70 is prevented.

Operations of Tire Vulcanizer

Next, operations of the tire vulcanizer 201 (tire vulcanizing method) will be described.

The high-pressure nitrogen gas supplied from the high-pressure gas supply port 12 is circulated in the medium circulating passage 51 by the pump 10, and in the meantime, heated to the predetermined temperature in the first heating device 11 and the second heating device 31. When the green tires G are vulcanized for the first time after starting operation of the tire vulcanizer 201, the tank 70 is in a non-pressure state. In this case, the switch valve 76 is opened. In the left center mechanism 4L, the normal-temperature and low-pressure nitrogen gas is supplied from the low-pressure gas supply port 14 to the interior of the bladder B through the medium supplying path 58 and the medium supplying path 55. In the right center mechanism 4R, the normal-temperature and low-pressure nitrogen gas is supplied from the low-pressure gas supply port 14 to the interior of the bladder B through the medium supplying path 59, the medium supplying path 60, and the medium supplying path 65. Thereby, the bladders B are extended, so that the bladders B are closely attached to the inner circumferential surfaces of the green tires G. The low-pressure gas supply port 14 is generally unused but supplies the low-pressure nitrogen gas only in a case where the interior of the tank 70 is in a non-pressure state.

When the shaping step is completed, the upper molds 3 and the lower molds 2 are closed. By closing the bypass automatic valves 18, 48 and opening the supply switching automatic valves 13, 43 and the exhaust switching automatic valves 17, 47, the closed circuit running from the medium circulating passage 51, the medium supplying passage 52, the interior of the bladder B of the left center mechanism 4L, the medium returning passage 53, the medium circulating passage 51, the medium supplying passage 62, the interior of the bladder B of the right center mechanism 4R, the medium returning passage 63, to the medium circulating passage 51 is formed, and the high-pressure nitrogen gas is circulated, so that the vulcanization and the patterning are performed.

When the vulcanization and the patterning are completed, the bypass automatic valves 18, 48 are opened, and the supply switching automatic valves 13, 43 and the exhaust switching automatic valves 17, 47 are closed. At the same time, the automatic switch valve 29 is closed and the automatic switch valve 72 is opened. The high-pressure nitrogen gas discharged from the interiors of the bladders B passes through the medium exhausting passage 56, the medium exhausting passage 66, and the medium exhausting passage 57 and is stored in the interior of the tank 70. When there is no pressure difference between the interiors of the bladders B and the interior of the tank 70, the nitrogen gas does not flow through the medium exhausting passages 56, 66, 57. Thus, when the difference between the pressure sensor 74 and the pressure sensor 75 becomes the fixed value or less, the automatic switch valve 72 is closed and the automatic switch valve 29 is opened, so that the nitrogen gas remaining in the interiors of the bladders B is exhausted from the exhaust port 23 to the exterior.

When the pressure difference between the pressure sensors 74, 75 at the time of switching between the automatic switch valve 72 and the automatic switch valve 29 is too small, switching between the automatic switch valve 72 and the automatic switch valve 29 takes time. When the pressure difference is too large, an energy loss is increased. Therefore, the pressure difference between the pressure sensors 74, 75 at the time of switching between the automatic switch valve 72 and the automatic switch valve 29 is preferably 0.01 to 0.03 MPa.

When the next green tires G are installed into the tire vulcanizer 201 and the shaping step is started, the bladders B are extended with the nitrogen gas stored in the interior of the tank 70 instead of the low-pressure nitrogen gas from the low-pressure gas supply port 14. Specifically, in the left center mechanism 4L, the nitrogen gas in the interior of the tank 70 is supplied to the interior of the bladder B through the medium supplying path 59, the medium supplying path 58, and the medium supplying path 55. In the right center mechanism 4R, the nitrogen gas in the interior of the tank 70 is supplied to the interior of the bladder B through the medium supplying path 60 and the medium supplying path 65. At this time, the pressure of the nitrogen gas is decompressed by the decompression valves 15, 45 and supplied to the interiors of the bladders B. In an actual operation, the pressure of the high-pressure nitrogen gas is about 2 MPa, and the pressure required for the shaping is about 0.01 to 0.02 MPa. Thereby, the bladders B are extended, so that the bladders B are closely attached to the inner circumferential surfaces of the green tires G. In such a way, by extending the bladders B with the nitrogen gas stored in the interior of the tank 70 instead of the low-pressure nitrogen gas supplied from the low-pressure gas supply port 14, thermal energy and pressure energy remaining in the tire vulcanizer 201 can be reused, and a supply amount of the low-pressure nitrogen gas supplied from the low-pressure gas supply port 14 can be decreased.

The nitrogen gas discharged from the interiors of the bladders B is collected into the interior of the tank 70. Specifically, in the left center mechanism 4L, the nitrogen gas discharged from the interior of the bladder B is collected into the interior of the tank 70 through the medium returning passage 53, the medium exhausting passage 56, and the medium exhausting passage 57. In the right center mechanism 4R, the nitrogen gas discharged from the interior of the bladder B is collected into the interior of the tank 70 through the medium returning passage 63, the medium exhausting passage 66, and the medium exhausting passage 57.

When the shaping step is completed, the upper molds 3 and the lower molds 2 are closed and the vulcanization and the patterning are started. As described in the first embodiment, immediately after the start (at the beginning) of the vulcanization and the patterning, the pressure of the closed circuit is lowered. Therefore, in the first embodiment, the normal-temperature and high-pressure nitrogen gas is supplemented into the closed circuit from the high-pressure gas supply port 12. However, in the present embodiment, before forming the closed circuit, the automatic switch valve 29 is closed and the automatic switch valve 72 is opened, so that the nitrogen gas in the interior of the tank 70 is supplied to the interiors of the bladders B. It should be noted that by closing the supply switching automatic valves 13, 43 and the exhaust switching automatic valves 17, 47 and opening the bypass automatic valves 18, 48, a high-temperature and high-pressure nitrogen gas is circulated in the medium circulating passage 51.

Specifically, in the left center mechanism 4L, the nitrogen gas in the interior of the tank 70 is supplied to the interior of the bladder B through the medium supplying path 59, the medium supplying path 58, and the medium supplying path 55. In the right center mechanism 4R, the nitrogen gas in the interior of the tank 70 is supplied to the interior of the bladder B through the medium supplying path 60 and the medium supplying path 65. In such a way, by using the nitrogen gas stored in the interior of the tank 70 at the beginning of the vulcanization and the patterning, the thermal energy and the pressure energy remaining in the tire vulcanizer 201 can be reused, and a supply amount of the high-pressure nitrogen gas supplemented from the high-pressure gas supply port 12 can be decreased, so that thermal energy for heating the supplemented nitrogen gas can be decreased. By using the high-temperature nitrogen gas stored in the interior of the tank 70 at the beginning of the vulcanization and the patterning, a temperature of the interiors of the bladders B can be promptly increased, so that a vulcanization time can be shortened.

The nitrogen gas discharged from the interiors of the bladders B is collected into the tank 70. Specifically, in the left center mechanism 4L, the nitrogen gas discharged from the interior of the bladder B is collected into the interior of the tank 70 through the medium returning passage 53, the medium exhausting passage 56, and the medium exhausting passage 57. In the right center mechanism 4R, the nitrogen gas discharged from the interior of the bladder B is collected into the interior of the tank 70 through the medium returning passage 63, the medium exhausting passage 66, and the medium exhausting passage 57. At this time, when there is no difference between the pressure in the interior of the tank 70 and the pressure in the interiors of the bladders B, the nitrogen gas does not flow as well. Thus, when the difference between the pressure sensors 74, 75 becomes small, the automatic switch valve 72 is closed and the automatic switch valve 29 is opened, so that the nitrogen gas remaining in the interiors of the bladders B is exhausted from the exhaust port 23 to the exterior.

After that, the vulcanization and the patterning are performed with the nitrogen gas circulated in the medium circulating passage 51. By opening the supply switching automatic valves 13, 43 and the exhaust switching automatic valves 17, 47 and closing the bypass automatic valves 18, 48, the closed circuit is formed, and the high-temperature and high-pressure nitrogen gas is circulated in the closed circuit.

After completion of the vulcanization, the bypass automatic valves 18, 48 are opened again, and the supply switching automatic valves 13, 43 and the exhaust switching automatic valves 17, 47 are closed. After that, the automatic switch valve 29 is closed and the automatic switch valve 72 is opened, so that the nitrogen gas discharged from the interiors of the bladders B is stored in the interior of the tank 70. After that, the automatic switch valve 72 is closed and the automatic switch valve 29 is opened, so that the nitrogen gas remaining in the interiors of the bladders B is exhausted from the exhaust port 23 to the exterior.

By the above operations, the thermal energy and the pressure energy remaining in the tire vulcanizer 201 are reused at the time of the shaping. The thermal energy and the pressure energy remaining in the tire vulcanizer 201 at the beginning of the vulcanization and the patterning are reused. It should be noted that the energy may be reused at the time of the shaping or at the beginning of the vulcanization and the patterning. The energy to be reused is determined in accordance with a capacity of the tank 70. However, when it is assumed that a total capacity of the two bladders B and the capacity of the tank 70 are the same and heat emission to the exterior is the same, in comparison to a case where all the energy in the interiors of the bladders B is discharged, the energy of the pump 10, the first heating device 11, and the second heating device 31, which is required for vulcanizing one tire, can be saved by about 3%. An amount of the high-pressure nitrogen gas supplied from the main pipe via the high-pressure gas supply port 12 is decreased by about 30%. Thus, a facility for generating the high-pressure nitrogen gas can be downsized. Further, the high-temperature nitrogen gas in the interior of the tank 70 can be supplied to the interiors of the bladders B at the beginning of the vulcanization. Thus, the temperature of the interiors of the bladders B can be promptly increased, so that the vulcanization time can also be shortened.

Effects

As described above, with the tire vulcanizer 201 and the tire vulcanizing method according to the present embodiment, since the nitrogen gas is generally exhausted through the medium exhausting passage 57 after the completion of the vulcanization, the thermal energy and the pressure energy remaining in the tire vulcanizer 201 at the time of completing the vulcanization are released to the exterior of the tire vulcanizer 201, so that energy efficiency is unfavorable. Thus, the nitrogen gas discharged from the interiors of the bladders B is stored in the interior of the tank 70. The nitrogen gas stored in the interior of the tank 70 is supplied to the interiors of the bladders B at the time of the shaping. In general, the bladders B are extended with the low-pressure nitrogen gas supplied from the low-pressure gas supply port 14 at the time of the shaping. However, the bladders B are extended with the nitrogen gas stored in the interior of the tank 70 instead of the low-pressure nitrogen gas. In such a way, by extending the bladders B with the nitrogen gas stored in the interior of the tank 70, the thermal energy and the pressure energy remaining in the tire vulcanizer 201 can be reused, and the supply amount of the low-pressure nitrogen gas supplied from the low-pressure gas supply port 14 can be decreased.

The nitrogen gas stored in the interior of the tank 70 is supplied to the interiors of the bladders B at the beginning of the vulcanization and the patterning. In general, the vulcanization and the patterning are performed with the high-temperature and high-pressure nitrogen gas circulated in the medium circulating passage 51. However, since the pressure of the nitrogen gas is lowered at the beginning of the vulcanization and the patterning, there is a need for supplementing the high-pressure nitrogen gas from the high-pressure gas supply port 12 and heating the supplemented nitrogen gas. In this regard, by using the nitrogen gas stored in the interior of the tank 70 at the beginning of the vulcanization and the patterning, the thermal energy and the pressure energy remaining in the tire vulcanizer 201 can be reused, and the supply amount of the high-pressure nitrogen gas supplemented from the high-pressure gas supply port 12 can be decreased, so that the thermal energy for heating the supplemented nitrogen gas can be decreased. By using the high-temperature nitrogen gas stored in the interior of the tank 70 at the beginning of the vulcanization and the patterning, the temperature of the interiors of the bladders B can be promptly increased, so that the vulcanization time can be shortened. Thereby, the energy efficiency can be improved.

Modified Example of the Present Embodiment

The embodiments of the present invention are described above. However, the embodiments do not particularly limit the present invention but only show specific examples. Specific configurations and the like can be appropriately designed and changed. The operations and the effects described in the embodiments of the invention are only a list of the most preferred operations and effects generated from the present invention. The operations and the effects according to the present invention are not limited to the operations and the effects described in the embodiments of the present invention.

What is claimed is:

1. A tire vulcanizer, comprising:
   two sets of vulcanizing and patterning portions, each of which includes a lower mold, an upper mold openable and closable relative to said lower mold, and a center mechanism provided with a bladder to be installed in a green tire, said vulcanizing and patterning portions for squeezing the green tires with said lower molds and said upper molds after shaping of installing said bladders to the green tires, so as to perform vulcanization and patterning;
   a medium circulating passage for circulating a vulcanization gas;
   medium supplying passages respectively provided for said center mechanisms and connected to said medium circulating passage, said medium supplying passages for supplying the vulcanization gas circulated in said medium circulating passage to interiors of said bladders;
   medium returning passages respectively provided for said center mechanisms and connected to said medium circulating passage on the downstream side in a circulating direction of the vulcanization gas with respect to said medium supplying passages, said medium returning passages for recovering the vulcanization gas discharged from the interiors of said bladders to said medium circulating passage;
   a pump provided in said medium circulating passage, for pressurizing the vulcanization gas;
   supply switching valves respectively provided in said medium supplying passages, for opening and closing said medium supplying passages;
   exhaust switching valves respectively provided in said medium returning passages, for opening and closing said medium returning passages;
   bypass valves provided in said medium circulating passage and respectively arranged for said center mechanisms between a point where said medium supplying passages are connected to said medium circulating passage and a point where said medium returning passages are connected to said medium circulating passage, said bypass valves for opening and closing said medium circulating passage;
   a first heating device provided in said medium circulating passage and arranged on an upstream side with respect to a point where said medium supplying passage provided in said center mechanism which is placed on the upstream side in the circulating direction of the vulcanization gas is connected to said medium circulating passage;
   a first temperature sensor provided in an outlet of the first heating device, said first heating device for heating the vulcanization gas based on a temperature measured by the first temperature sensor;
   a second heating device provided in said medium circulating passage and arranged between a point where said medium returning passage provided in said center mechanism which is placed on the upstream side in the circulating direction of the vulcanization gas is connected to said medium circulating passage, and a point where said medium supplying passage provided in said center mechanism which is placed on a downstream side in the circulating direction of the vulcanization gas is connected to said medium circulating passage; and
   a second temperature sensor provided in an outlet of the second heating device, said second heating device for heating the vulcanization gas based on a temperature measured by the second temperature sensor.

2. The tire vulcanizer according to claim 1, further comprising:
   medium exhausting passages for exhausting the vulcanization gas discharged from the interiors of said bladders to an exterior;
   a tank provided in said medium exhausting passage, for storing the vulcanization gas discharged from the interiors of said bladders; and
   medium supplying paths respectively provided for said center mechanisms, for supplying the vulcanization gas in an interior of said tank to the interiors of said bladders,
   wherein at a time of at least one of the shaping and beginning of the vulcanization and the patterning, the vulcanization gas in the interior of said tank is supplied to the interiors of said bladders via said medium supplying paths.

3. A tire vulcanizing method performed by using the tire vulcanizer according to claim 1, comprising:
   a step of circulating the vulcanization gas in said medium circulating passage by said pump while closing said supply switching valves and said exhaust switching valves, opening said bypass valves, and heating the vulcanization gas by using at least one of said first heating device and said second heating device; and a step of supplying the vulcanization gas to the interiors of the bladders by said medium supplying passages while opening said supply switching valves and said exhaust switching valves, closing said bypass valves, and heating the vulcanization gas by using said first heating device and said second heating device, and recovering the vulcanization gas discharged from the interiors of said bladders to said medium circulating passage by said medium returning passages, so as to vulcanize and pattern the tires.

4. A tire vulcanizer, comprising:

two sets of vulcanizing and patterning portions, each of which includes a lower mold, an upper mold openable and closable relative to said lower mold, and a center mechanism provided with a bladder to be installed in a green tire;

a medium circulating passage;

two sets of medium supply passages, each medium supply passage respectively connected to one of said center mechanisms of said two sets of vulcanizing and patterning portions and connected to said medium circulating passage;

two sets of medium return passages, each medium return passage respectively connected to one of said center mechanisms of said two sets of vulcanizing and patterning portions and connected to said medium circulating passage on the downstream side in a circulating direction of the vulcanization gas with respect to said medium supply passages;

a pump located in said medium circulating passage;

two sets of supply switching valves, each supply switching valve respectively located in one of said two sets of medium supply passages;

two sets of exhaust switching valves, each exhaust switching valve respectively located in one of said two sets of medium return passages;

two sets of bypass valves located in said medium circulating passage and respectively arranged relative to each center mechanism of the two sets of vulcanizing and patterning portions between a point where said medium supply passages are connected to said medium circulating passage and a point where said medium return passages are connected to said medium circulating passage;

a first heating device provided in said medium circulating passage and arranged on an upstream side of a first one of said two sets of vulcanizing and patterning portions;

a first temperature sensor provided in an outlet of the first heating device;

a second heating device provided in said medium circulating passage and arranged on a downstream side of first one of said two sets of vulcanizing and patterning portions and upstream of a second one of said two sets of vulcanizing and patterning portions; and a second temperature sensor provided in an outlet of the first heating device.

5. The tire vulcanizer according to claim 4, further comprising:

two sets of medium exhaust passages, each medium exhaust passage respectively connected to one of said two sets of medium return passages;

a tank connected to said two sets of medium exhaust passages; and two sets of medium supply paths, each medium supply path respectively connected to one of said two sets of medium supply passages.

6. The tire vulcanizer according to claim 5, wherein the medium circulating passage is arranged around the tank.

7. A tire vulcanizing method, comprising:

supplying a low pressure gas to interiors of two bladders that are each respectively installed in a green tire;

circulating a vulcanization gas in a circulating passage with a pump located in circulating passage, heating the vulcanization gas as the vulcanization gas circulates through the circulating passage with two heating devices that are each separate and distinct from the pump;

supplying the vulcanization gas to the interiors of the two bladders so as to vulcanize and pattern the green tires; and recovering the vulcanization gas discharged from the interiors of said bladders to a tank for use as the low pressure gas in a subsequent vulcanizing process.

* * * * *